United States Patent [19]

Belk

[11] Patent Number: 4,691,866
[45] Date of Patent: Sep. 8, 1987

[54] GENERATION OF SEED PARTICLES

[75] Inventor: Thomas J. Belk, St. Louis, Mo.

[73] Assignee: Ethyl Corporation, Richmond, Va.

[21] Appl. No.: 796,190

[22] Filed: Nov. 8, 1985

[51] Int. Cl.$^4$ .............................................. B02C 19/12
[52] U.S. Cl. .......................................... 241/5; 241/6;
241/9; 241/12; 241/13; 241/24; 241/40;
241/10; 241/80
[58] Field of Search ................... 241/5, 24, 40, 79, 80,
241/6, 9, 12, 13, 10

[56] References Cited

U.S. PATENT DOCUMENTS

| | | |
|---|---|---|
| 3,305,414 | 2/1967 | Hodgson ........................... 241/40 X |
| 3,853,274 | 12/1974 | Wright et al. ......................... 241/40 |
| 4,207,360 | 6/1980 | Padovani . | 
| 4,314,525 | 2/1982 | Hsu et al. . |
| 4,323,198 | 4/1982 | Turner et al. ...................... 241/40 X |
| 4,354,641 | 10/1982 | Smith ..................................... 241/40 |
| 4,424,199 | 1/1984 | Iya . |

FOREIGN PATENT DOCUMENTS 899303 5/1972 Canada .
1021752 11/1977 Canada .

Primary Examiner—Timothy V. Eley
Attorney, Agent, or Firm—Donald L. Johnson; John F. Sieberth; Robert A. Linn

[57] ABSTRACT

A gun-target apparatus and method for producing silicon seed particles from silicon feed particles comprising accelerating silicon feed particles from a container and propelling them into a silicon target in a target chamber. The target is movable within said chamber so that a different portion of the silicon target is exposed to the oncoming seeds. The seeds are accumulated in a receiver and separated from silicon dust and larger feed particles.

14 Claims, 1 Drawing Figure

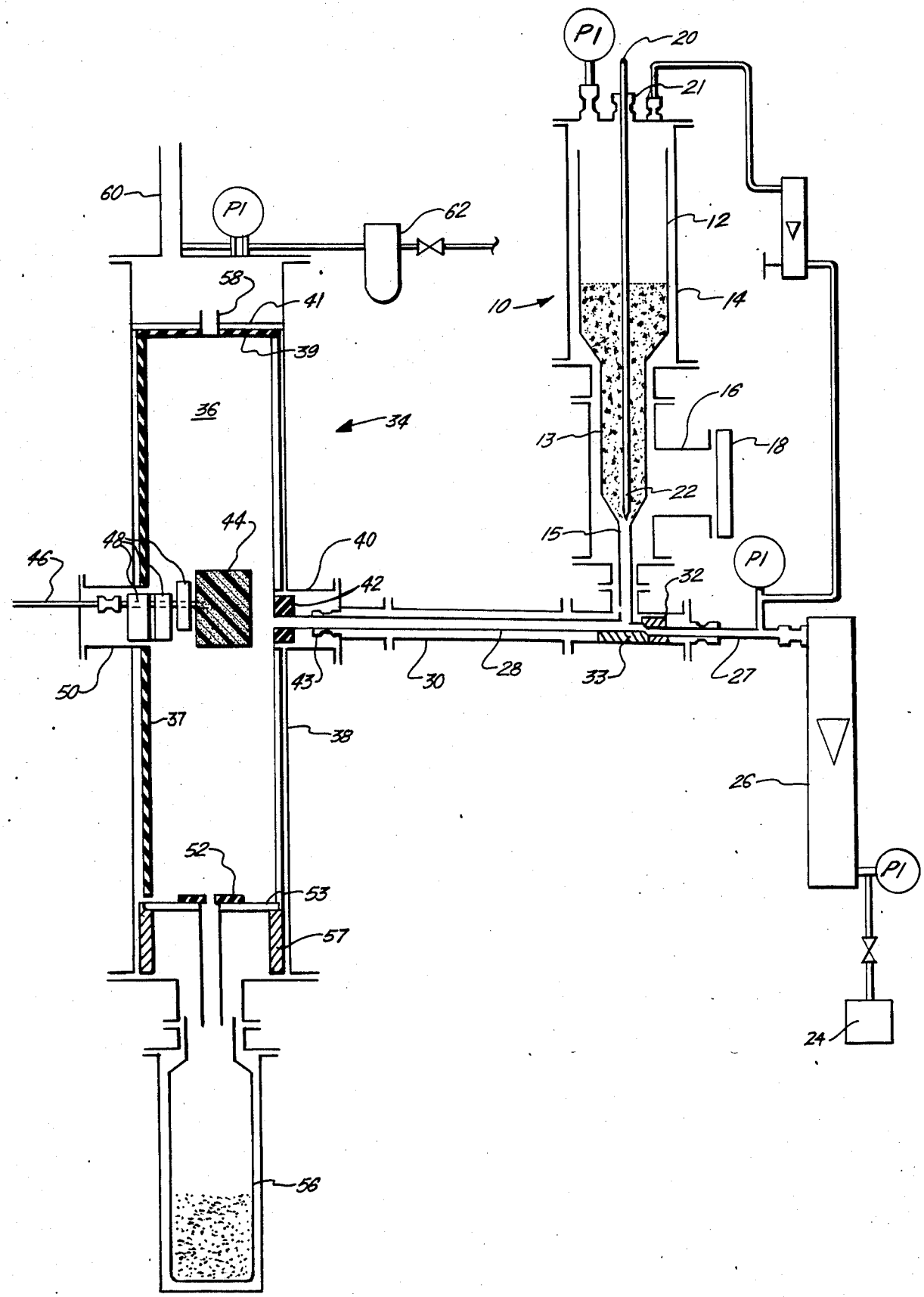

GENERATION OF SEED PARTICLES

CROSS REFERENCE

This application is related to my copending application Ser. No. 824,537, filed Jan. 31, 1986.

BACKROUND OF THE INVENTION

The present invention relates to high purity silicon in general and in particular to the preparation of small silicon particles which are usable as seeds in a fluid bed coating apparatus.

It has been suggested to propel seeds from a container with a stream of inert gas into a target in a second container. That suggestion is inadequate because the target deteriorates before any significant amount of seed particles may be generated. There has never been proposed adequate means for maintaining the intergrity of the target and the purity of the silicon feed particles and seed particles. Also, it is often necessary to provide means for separating the seed particles from unbroken feed particles and dust too small to be used as a seed particle.

SUMMARY OF THE INVENTION

The present invention is directed to the preparation of silicon particles which are suitable for use as seeds in a fluid bed chemical vapor deposition process and suitable for other seed particle uses. According to the invention, the seeds are generated by a gun-target apparatus and method wherein the silicon feed particles are accelerated and propelled into a silicon target within a target chamber so as to fracture or split said feed particles into seed particles which are then recovered for use. Also according to the invention, the silicon target is movable such that the stream of oncoming feed particles impinges upon a different portion of the target as it is intermittently moved.

DESCRIPTION OF THE DRAWING FIGURE

The figure is a schematic of a preferred embodiment of dispensing silicon feed particles for impact against the movable silicon target within the target chamber to make silicon seed particles.

DESCRIPTION OF THE PREFERRED EMBODIMENTS

A preferred embodiment of the invention is a gun-target apparatus for producing silicon seed particles from silicon feed particles larger than said seed particles, said apparatus comprising a feed particle dispensing container; a target chamber; a silicon target positioned within said target chamber and target moving means for moving said target within said chamber; feed particle accelerator means for propelling a stream of said feed particles into said target so as to split feed particles and optionally split off a portion of said silicon target; and a seed particle receiver to accumulate the seed particles.

Another preferred embodiment of the invention is a silicon seed generator comprising:

(a) a feed particle reservoir for dispensing silicon feed particles;

(b) a feed particle accelerator comprising a source of inert gas directed into a gas jet stream, said jet stream being positioned to receive silicon feed particles dispensed from said reservoir and accelerate said particles;

(c) a target chamber fluidly communicating with said jet stream such that said silicon feed particles are propelled into said target chamber;

(d) a movable silicon target positioned in said target chamber so that silicon feed particles propelled into said target chamber impact said silicon target and split into seed particles;

(e) means for moving said target so that feed particles from said jet stream impact on a different portion of said target; and (f) a seed particle receiver disposed below said target chamber for accumulating said seed particles generated by the impact of feed particles on said target.

Another preferred embodiment of the invention is a method of generating silicon seed particles, said method comprising the steps of:

dispensing silicon feed particles of about 300-2000 microns from a feed particle vessel into a stream of inert gas moving at a rate sufficient to accelerate and propel said feed particles from said vessel;

directing said stream of inert gas into a target chamber containing a movable silicon target and impacting the feed particles entrained in said stream into said movable silicon target thereby splitting said feed particles and forming seed particles of about 88-400 microns;

periodically moving said silicon target so that the feed particles in said stream impact on a different portion of said silicon target; and collecting said silicon seed particles.

According to the invention, any size silicon feed particles may be used to impact against a silicon target and form smaller seed particles. In a preferred embodiment of the invention, feed particles ranging from a size having a mean diameter of 400 microns to a size having a mean diameter of about 2000 microns are used. The feed particles are provided to a feed particle container which may have means for controlling the rate of dispensing the feed particles. It is possible to size the exit from the feed particle container such that the feed particles of silicon flow at a reasonable dispensing rate to be thereafter accelerated and propelled into the silicon target. The feed particle container is preferably lined with or formed of a noncontaminating substance such as quartz, silicon carbide, sialon, or silicon. The container may be kept under a slight vacuum or a blanket of inert gas such as nitrogen or a noble gas such as argon.

In one embodiment, a needle valve device is provided in the feed particle container so that a small orifice in the bottom of the feed particle container may be intermittently and controllabley blocked and unblocked with a needle which extends from the bottom of the container through the top of the container. The needle valve, when sealed at the top of the container may then be moved vertically to open and close the small orifice at the bottom of the container to controllably and intermittently dispense silicon feed particles from the container.

The entire feed particle container may be surrounded by a protective casing. This casing preferably has a sight glass portion formed so as to provide a view of the bottom portion of the feed particle container wherein the bottom portion is formed of a transparent substance such as quartz. In this manner, the dispensing of silicon feed particles may be viewed and more readily controlled for providing a proper rate of flow of the particles and the supply of feed particles may be properly maintained. Also preferably, the feed particles may be dispensed by using a motive gas to transport the feed particles from the feed particle container. In this mode of the invention, the feed particle container is preferably equipped with a gas tight valve and an angle of repose valve which permits a noncontaminating manner of dispensing the silicon feed particles for accelerating them into a silicon target. An angle of repose valve may also be used to supply feed particles to the dispensing container.

The silicon feed particles, once dispensed from the silicon feed particle conatiner, are accelerated in a direction toward a silicon target. The preferred means of accomplishing the acceleration of the particles so as to propel them into the silicon target is the use of a gas stream or jet of gas which may be supplied in a noncontaminating tube or by other means so as to receive the particles being dispensed from the feed particle container. Preferably, an inert gas such as nitrogen or a noble gas, preferably argon, is used as the stream or jet of gas to accelerate and propel the silicon feed particles. A quartz or other noncontaminating tube is preferred to control the jet of gas which propels the silicon feed particles into the silicon target. A silicon tube is highly preferred.

The tube or other apparatus used for the flow of the jet or stream of gas is preferably sealingly connected to a silicon target chamber which contains the silicon target for impact of the propelled silicon feed particles. It is to be understood that the entire method and apparatus of the invention may be conducted in a manner to avoid contamination of the silicon feed particles and silicon seed particles formed therefrom. The particles are preferably of a very high purity, especially for electronic silicon applications. Preferably the stream of gas accelerating feed particles is conducted through a high purity silicon tube.

The silicon target chamber is lined with silicon or silicon carbide, or formed or quartz or another noncontaminating material such that the silicon feed particles accelerate thereinto and seed particles formed by the splitting of feed particles are not contaminated. The seed particles may thereafter be used in a fluid bed process to form additonal product silicon particles. The silicon target chamber is preferably encased in a more protective and rigid material such as a steel and is preferably lined with pure silicon.

In a preferred embodiment, the stream or jet of gas directed into the silicon target chamber is exhausted through the upper portion of the target chamber. This exhaust of gas from the silicon target chamber may be of such a velocity and the chamber may be so designed as to entrain silicon particles smaller than the silicon seed particles and remove such small particles (usually considered a "dust") from the silicon target chamber thereby effecting a separation from the seed particles and any unbroken feed particles. The unbroken feed particles and large particles broken from the silicon target in the silicon target chamber may be recycled to the feed particle container.

A receiver or container for accumulating the formed silicon seed particles is disposed below the target chamber or at another location such that the formed silicon seed particles are directed into the receiver so that the seed particles may be accumulated for use in a fluid bed or other application.

It is to be understood that the seed particles may be formed by the fracture or splitting of the silicon feed particles. They may also be formed by the splitting or pitting of the silicon target disposed within the silicon target chamber.

It should also be realized that some of the seed particles may be larger than some of the feed particles, although the average feed particle has a greater mass and larger mean diameter. The overlap in size for the ranges of seed particles and feed particles is to be expected since separation techniques are not 100% effective. Thus while a small portion of the feed particles may be "small" (300–400 microns), a small portion of the seed particles recovered as product may be "large" (also 300–400 microns).

According to the invention, the silicon target is movable within the target chamber, preferably by means outside the chamber. A preferred embodiment of the means for moving the silicon target is shown in the description below and in the drawing. Another method of moving the target is to provide a relatively brittle and long silicon target which may be continuously pushed in a direction toward the oncoming jet of gas so that as the silicon target is worn away, additional fresh silicon target is available for impact of the feed particles. In this method however, the pitted face of the target must be periodically cut off to expose a fresh target face. While the silicon target is preferably connected to a rod or other means which extends outside the target chamber, it is also possible to bond the silicon to magnetic material carried inside the chamber such that the target may be rotated or otherwise moved by magnetic means.

A better understanding of the invention will be had by a review of the following description when read in conjunction with the drawing.

Referring to the drawing FIG. 1, a silicon feed particle container apparatus 10 is illustrated. The apparatus 10 contains a feed particle quartz feed bottle 12 preferably formed of noncontaminating materials such as quartz. For the particular apparatus herein described, the quartz feed bottle 12 may be a 95 mm outside diameter bottle with a small lower 54 mm outside diameter neck area 13 connected directly to a bottom 12 mm outside diameter tube 15. The quartz feed bottle 12 is surrounded by a four inch diameter 3/16 stainless steel shell 14 which has formed therein a sight glass portion 16 to fit sight glass 18 for viewing the dispensing of silicon feed particles from the quartz feed bottle 12. A needle valve apparatus 20 may be sealingly disposed from the top of quartz bottle 12 to the bottom thereof wherein an orifice is formed and the tapered tip 22 of the needle valve 20 fits sealingly in the orifice such that no silicon feed particles are dispensed from the quartz feed bottle 12 when the needle valve is in the downward position. Accordingly, operation of the needle valve by lifting it up somewhat permits dispensing of silicon feed particles through the bottom of the quartz tube 12 and into an oncoming jet of gas. It is to be understood that the needle valve apparatus is optional and not preferred since an appropriately sized orifice readily suffices for dispensing particles. The entire silicon feed particle container apparatus 12 may be kept under a blanket of nitrogen or other inert gas.

The stream or jet of gas is supplied from a pressurized source 24 through a 0.03 micron filter and a meter 26 and is directed from a ⅜ inch stainless steel tube 27 into a quartz or preferably silicon particle tube 28 which is in turn encased in a stainless steel tubing 30. The tube 28 has an inside diameter of 8 mm, a 12 mm outside diameter, and a length of about 18 3/16 inches. A hole is formed about 17 1/16 inches from the downstream end to accomodate the bottom tube 15 of feed bottle 12. The tube length must be adequate to provide particle velocity which results in particle fracture against the target. The fluid connection between quartz feed bottle 12 and quartz tube 28 may be supported with a silicon piece 33 which supports the tube 28 where the feed bottle 12 rests on it. The piece 33 is a ½ inch inside diameter by one inch outside diameter single crystal silicon tube with the top half cut off to form a "U" shaped cradle. The exit end of tube 27 is supported by a polytetrafluoroethylene alignment piece 32 having a one inch outside diameter, a ⅜ inch inside diameter upstream, and a ½ inch inside diameter downstream to support the particle jet and assure alignment of stainless steel tube 27 with quartz tube 28.

Thereafter, the jet of gas with entrained feed particles is directed into a target chamber apparatus 34 which comprises a target chamber 36 having a six inch diameter Schedule 5 304 stainless steel shell 38. The chamber 36 is preferably formed of a silicon liner 37. The silicon liner avoids contact of the product with steel (iron is a bad contaminant). Preferably, the liner is a 36 inch length of 135 mm inside diameter by 147 mm outside diameter tube with two 2⅜ inch holes drilled for tees at opposite sides. Cloth bands may be wrapped around the liner to cushion and center it within shell 38. A top plate 39 of silicon may be formed and glued to a quartz riser plate 41 formed in shell 38. The shell 38 has a tee or extended portion 40 formed from a 2½ inch 316 stainless steel triclamp ferrule which sealingly accepts the quartz or silicon tube 28.

The quartz tube 28 has disposed about its end a silicon particle jet shield 42 which prevents reflection of silicon particles back against the tube 28 or stainless steel portion of the shell 38 and thereby prevents contamination and breakage. The silicon feed particles are accelerated into a two inch thick single crystal 3¼ inch silicon target disc 44 which is, depending upon the exact nature of the silicon forming the target 44, subject to breakage, pitting, and fracture. So long as a suitable silicon is used to form the target, this does not present a contamination problem for the seed particles formed or additional feed particles formed and recycled.

The silicon target 44 is mounted on target support and turning rod 46 so as to be aligned in a nonconcentric manner with the incoming flow of gas and silicon feed particles from quartz or silicon tube 28. In this manner of mounting the silicon target 44, target support and ¼ inch turning rod 46, the target may thereby be rotated so as to expose fresh portions of the silicon target 44 to the oncoming particles at intermittent times to provide a fresh surface for impact. Silicon disk rod protectors 48 are also mounted on target support and turning rod 46 so as to prevent exposure of the rod to the inside of chamber 36 and thereby prevent contamination of the seed particles formed.

Steel shell 38 has a second extended portion 50 to accommodate the structure of the target support and turning rod 46 and silicon disk rod protectors 48.

The silicon seed particles fall through an opening in the bottom of target chamber 36 and through an opening in the bottom of steel shell 38 into a receiver 56 which may optionally be protected with a blanket of inert gas to protect the integrity and purity of the formed seed particles. The stream of gas entering from tube 28 may be exhausted through an opening 58 in the upper portion of the target chamber 36 and in turn through an opening 60 in the upper portion of the steel shell.

A steel ring liner support 57 is provided below the silicon target chamber 36 for support. A quartz plate (with drain tube) 53 is supported on support 57 and silicon disc 52 prevents contamination of seed particles falling from target 44.

Quartz tube 28 and needle valve 20 are preferably sealed with o-rings 43 and 21 as shown. Furthermore, the size and shape of the target chamber 36 and steel shell 38 may be constructed so that the flow of exhaust gas is sufficient to entrain at least a portion of the silicon dust particles formed, such dust particles being smaller than said seed particles and susceptible to entrainment in the exhaust gas at the velocity of the gas as designed. This facilitates separation of the silicon dust from the seed particles and any unbroken feed particles. A filter device 62 may also be provided as shown to accumulate the dust where desired.

Since the foremost utility for the silicon seed particles formed according to the apparatus and method of the invention is as seeds for a fluid bed process to form electronic grade silicon, a preferrred embodiment of the invention includes forming all of the contact surfaces of the apparatus used in the method of the invention of such materials that they do not contaminate the silicon seed particles with contaminants which are known to affect electronic properties. These contaminants include iron, arsenic, carbon, phosphorus, aluminum, and the like.

Although the apparatus and method of the invention may be used to handle a broad range of particles for both the feed particles and the formed seed particles and although a suitable gas velocity may be provided for any size feed particles dispensed into the gas stream, a practical range for particles of the mean diameter described above is a velocity of about 400 to 1200 feet per second. A preferred range is 600-800 feet per second. It should be appreciated that the velocity of the gas stream affects the amount of silicon loss due to dust formation.

Using the movable silicon target device described above, it is posible to intermittently or preferably constantly rotate the silicon target to give about 8 times as much operating time and use from the target as if the target were left in a single position. Alternatively, a very long silicon target is intermittently urged toward the oncoming jet stream by a slider rod as the face of the target is chipped off or pitted out by the oncoming feed particles. In this method, the pitted face of the target should be intermittently cut off to provide a new surface. Therfore, it can be seen that it is preferable to use a highly pure silicon material for the target. The use of a single crystal material may be preferable in some circumstances since this may tend to be more brittle than a polycrystalline silicon or amorphous silicon.

Operation of the apparatus described above has resulted in the production of suitable seed particles from various sized feed particles ranging from 500 to 1400 microns in mean diameter. The heavy particles not small enough to serve as the desired size seed particles may be recycled to the feed particle container and the product fines may be disposed of or recaptured for another utility. Typical product fines formed in the apparatus described above have an average mean diameter of less than about 88 microns with a largest diameter of up to about 150 microns.

Using the method and apparatus of the above described invention it has been possible to achieve yields of particles of suitable diameter for use in a fluid bed in the range of about 60 to 80%. This compares very favorably with conventional grinders which tend to contaminate the silicon product and produce only about 30% particles suitable for seed use since a very high portion of dust is formed.

EXAMPLE

In an apparatus like that shown in FIG. 1, a supply (about 2.0 Kg) of high purity silicon feed pellets of about 1190-1400 micron diameter was supplied from a feed particle container to a zero grade nitrogen stream moving at 780 feet per second in a horizontal quartz tube and fired into a silicon lined target chamber so as to impact on a block of high purity silicon. The silicon target was rotable so that the oncoming stream could be directed onto a fresh portion of the surface of the silicon target which was much larger than the cross sectional area of the stream containing the silicon feed particles. The 1190-1400 micron silicon feed particles were impacted into the silicon target and classified somewhat to determine the efficiency of producing seeds of various sizes. Three separate runs were made. In the first run approximately 10 seed particles of mean particle diameter of 210 to 500 microns were formed for each feed particle charged. About 12.3 particles of from about 210 microns up to about the size of the feed particles were formed per particle charged to the apparatus. The fines (dust) from the process, were discarded in each case. In the second run, approximately 8.3 particles of 210 to 500 microns were formed per particle charged and 10.4 particles of 210 to feed particle size were formed per particle charged to the apparatus. In the third run the corresponding numbers were 7.6 particles and 9.7 particles. The sum of the three runs produced about 35.6 particles of diameters ranging from 106 microns to the size of the feed particles per particle charged to the apparatus. An apparatus like that shown in FIG. 1 and described above has been used successfully in a large number of operations to produce seeds suitable for use in a fluidized bed chemical vapor deposition process.

The invention is not limited by the particle description above or the drawing figure. Having described the process and apparatus of the invention, it is possible to vary the method and apparatus particular described without departing from the lawful scope or true spirit of the invention.

I claim:

1. A method of generating silicon seed particles, said method comprising the steps of:
   dispensing silicon feed particles of about 300-2000 microns from a feed particle vessel into a stream of inert gas moving at a rate sufficient to accelerate and propel said feed particles from said vessel;
   directing said stream of inert gas into a target chamber containing a disc-shaped, movable silicon target and impacting the feed particles entrained in said stream into said movable silicon target thereby splitting said feed particles and forming seed particles of about 88-400 microns;
   rotatably moving said movable silicon target so that said feed particles in said stream impact on a different portion of said silicon target; and
   collecting said silicon seed particles.

2. The method of claim 1 wherein said target chamber is lined with a material noncontaminating to silicon so as to preserve the purity of said silicon seeds.

3. The method of claim 1 further comprising separating said silicon seed particles from larger silicon particles including any feed particles not split on impact with said silicon target and larger silicon particles split from said silicon target and recycling said larger silicon particles to said feed particle vessel.

4. The method of claim 1 further comprising exhausting said stream of inert gas from said target chamber so as to entrain at least a portion of the silicon dust particles smaller than said seed particles and thereby separate said portion of dust particles from said seed particles.

5. A gun-target apparatus for producing silicon seed particles from silicon feed particles larger than said seed particles, said apparatus comprising:
   a feed particle dispensing container;
   a target chamber;
   a disc-shaped, movable silicon target larger than said seed particles and positioned within said target chamber;
   feed particle accelerator means comprising a stream of inert gas for propelling a stream of feed particles onto said target so as to split said feed particles and thereby form said seed particles;
   target moving means for rotatably moving said target in a non-concentric manner within said target chamber to expose a fresh portion of said target to said stream feed particles as it is moved; and
   a seed particle receiver to accumulate the seed particles.

6. The apparatus of claim 5 wherein said feed particle container further comprises means for admitting said feed particles at a controlled rate into said jet of gas.

7. The apparatus of claim 5 wherein said target chamber is substantially entirely silicon lined.

8. The apparatus of claim 5 wherein said seed particle receiver is disposed below said target chamber to accumulate seed particles by gravity flow.

9. The apparatus of claim 5 further comprising means for separating from said seed particles, silicon dust smaller than said seed particles.

10. The apparatus of claim 9 wherein said means for separating silicon dust comprises a gas stream in said target chamber of sufficient velocity to entrain said silicon dust but not said seed particles.

11. The apparatus of claim 10 wherein said feed particles accelerator means comprises a jet of gas impinging on feed particles and propelling said particles through a tube and into said silicon target and wherein said target chamber has a port for exhausting the gas from said jet so as to entrain at least a portion of said silicon dust but not silicon seed particles.

12. The apparatus of claim 5 wherein said feed particles are in the mean diameter range of 300-2000 microns and said jet of gas is of a sufficient rate to accelerate said feed particles from said feed particle container into said target.

13. A silicon seed generator comprising:
   (a) a feed particle reservoir for dispensing silicon feed particles;
   (b) a feed particle accelerator comprising a source of gas directed into a gas jet stream, said jet stream being positioned to receive silicon feed particles dispensed from said reservoir and accelerate said particles;
   (c) tube means formed of material noncontaminating to silicon for conducting said gas jet stream and feed particles entrained therein, said tube means having one end supplied with a stream of an inert gas, and an opposite end connected to a target chamber;

(d) said target chamber fluidly communicating with said tube means so that said jet stream propels silicon feed particles into said target chamber;

(e) a movable silicon target larger than said feed particles and positioned in said target chamber so that silicon feed particles propelled into said target chamber impact said silicon target and split into seed particles;

(f) means for rotatably moving said target so that feed particles from said jet stream impact on a different portion of said target as said target is moved;

(g) a silicon particle jet shield about said opposite end of said tube means to shield said tube means from silicon particles reflected from said silicon target; and (h) a seed particle receiver disposed below said target chamber for accumulating seed particles generated by the impact of feed particles on said target.

14. The apparatus of claim 13 wherein said target chamber has a port in the upper portion thereof to exhaust from said chamber the gas from said inert gas jet stream and entrained dust particles smaller than said seed particles.

* * * * *

UNITED STATES PATENT AND TRADEMARK OFFICE
CERTIFICATE OF CORRECTION

PATENT NO. : 4,691,866
DATED : September 8, 1987
INVENTOR(S) : Thomas J. Belk

It is certified that error appears in the above-identified patent and that said Letters Patent is hereby corrected as shown below:

Column 2, line 50, "controllabley" should read -- controllably --.

Column 3, line 38, "or quartz" should read -- of quartz --.

Column 3, line 43, "additonal" should read -- additional --.

Column 5, line 5, "silicon piece" should read -- silicon support piece --.

Column 6, line 42, "posible" should read -- possible --.

Column 6, line 51, "Therfore" should read -- Therefore --.

Signed and Sealed this

Fifth Day of January, 1988

Attest:

DONALD J. QUIGG

Attesting Officer     Commissioner of Patents and Trademarks